United States Patent [19]

Hope et al.

[11] 4,088,419

[45] May 9, 1978

[54] WIND OPERATED POWER PLANT

[76] Inventors: Henry F. Hope; Stephen F. Hope, both of 2421 Wyandotte Rd., Willow Grove, Pa. 19090

[21] Appl. No.: 738,133

[22] Filed: Nov. 2, 1976

[51] Int. Cl.² .............................................. F03D 7/00
[52] U.S. Cl. ........................................ 415/2; 415/60; 415/216; 290/55
[58] Field of Search ...................... 415/2–4, 415/60, 208, 216; 290/43, 44, 54, 55; 417/424

[56] References Cited

U.S. PATENT DOCUMENTS

| 326,718 | 9/1885 | Collins | 415/4 |
| 932,353 | 8/1909 | Daub | 415/60 |
| 1,439,316 | 12/1922 | McArdle | 415/2 |
| 2,555,807 | 6/1951 | Morris | 290/55 |
| 3,339,078 | 8/1967 | Crompton | 415/2 |
| 3,928,771 | 12/1975 | Straumsnec | 290/54 |

FOREIGN PATENT DOCUMENTS

| 880,130 | 3/1943 | France | 290/55 |
| 973,968 | 2/1951 | France | 415/60 |
| 977,561 | 4/1951 | France | 415/2 |
| 729,533 | 12/1942 | Germany | 415/4 |
| 2,451,751 | 5/1976 | Germany | 415/2 |

Primary Examiner—C. J. Husar

Attorney, Agent, or Firm—Zachary T. Wobensmith, 2nd; Zachary T. Wobensmith, III

[57] ABSTRACT

An air operated power plant is provided with a pair of impellers rotating on vertical axes. A pair of panels is mounted in fixed relation to the impellers forming a V-shaped converging tunnel with the impellers near the rear of the V. The purpose of the tunnel is to act as an amplifier taking the wind from a large cross section and amplifying its speed and power and thereby concentrating its effect on the vanes of the impellers. The panels are built in the shape of vertical airfoils with the negative surfaces disposed outwardly so that wind which passes outside the structure will create a vacuum outside and behind the structure. The panels have openings behind the impellers so that the vacuum caused by the airfold design forceably draws air compressed in the tunnel out past the impellers. The impellers and the entire power plant can be mounted to extend upwardly from the ground eliminating the need for a costly supporting tower. The impeller shafts can drive electric generators or any other desired load. The assembly can be turned to face the tunnel to the best position for wind entrance and for this purpose an orienting vane is preferably mounted on the top of the structure. Guy wires may be disposed from the top to the ground to give the structure additional support.

10 Claims, 6 Drawing Figures

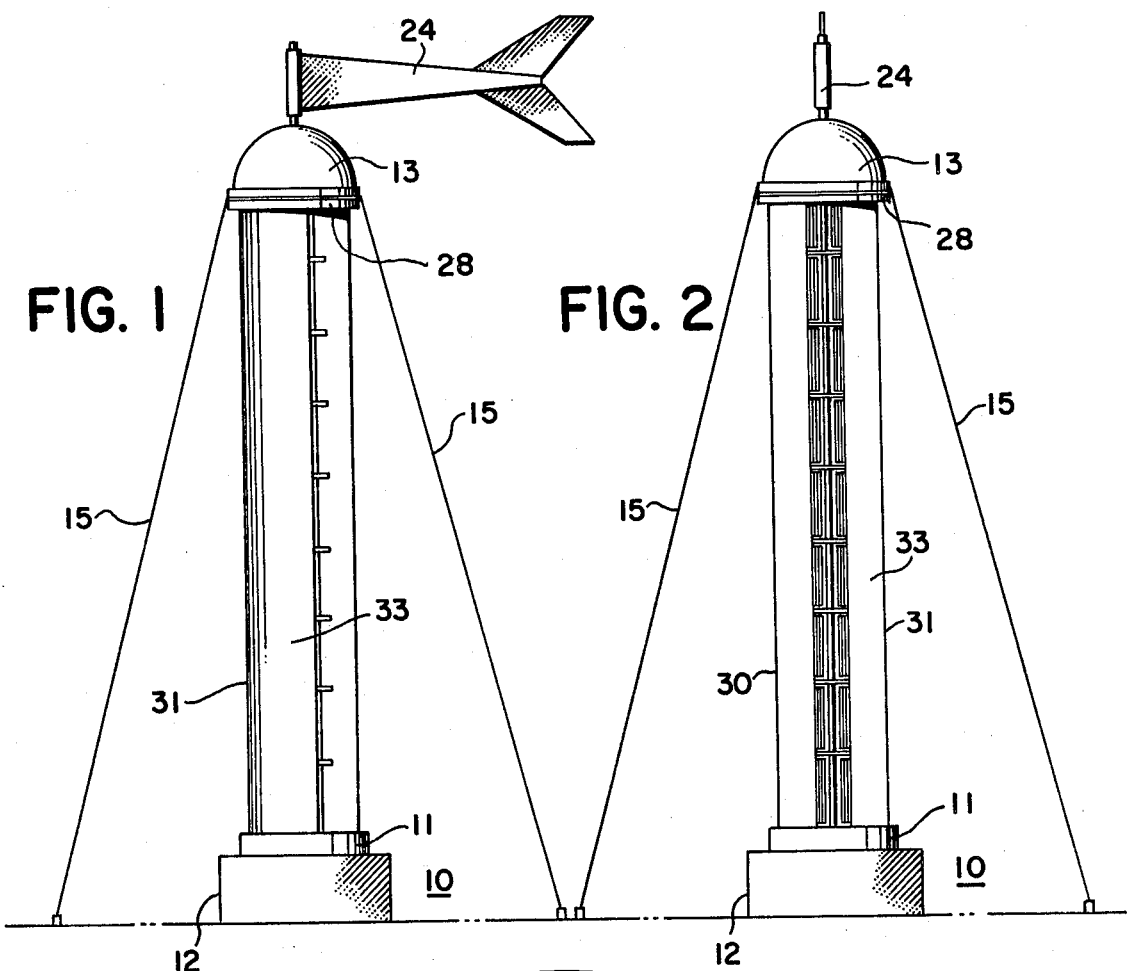
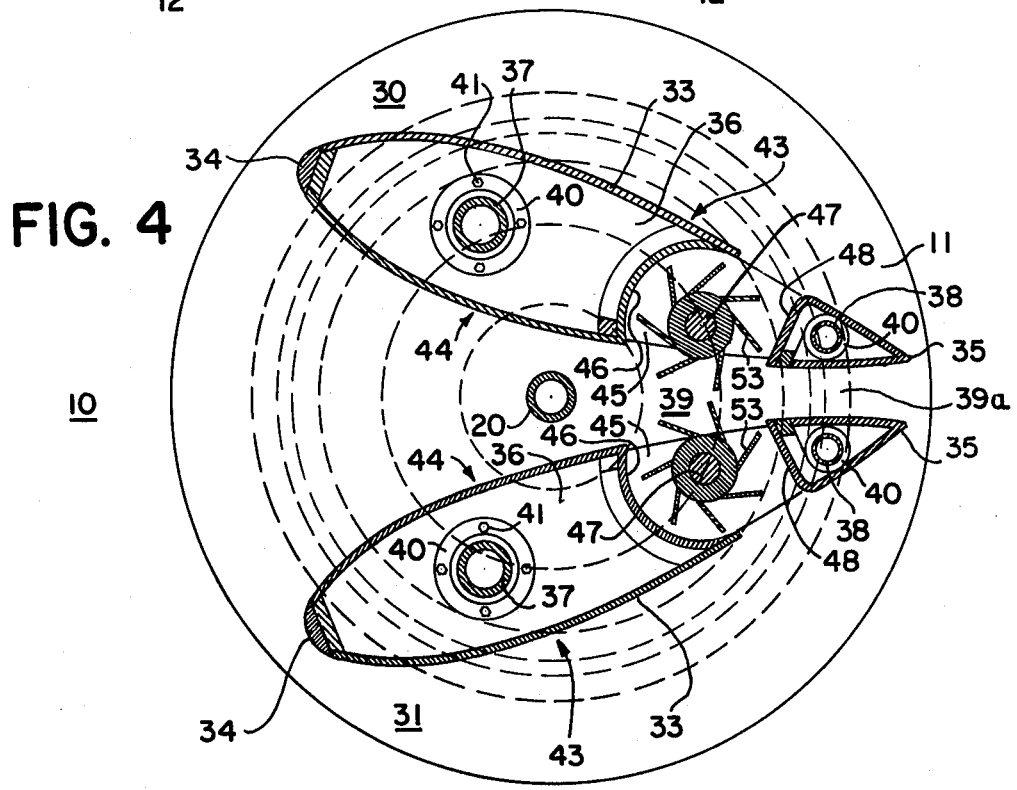

WIND OPERATED POWER PLANT

BACKGROUND OF THE INVENTION

1. Field of the Invention

This invention relates to a wind operated power plant.

2. Description of the Prior Art

Various types of wind operated motors have heretofore been proposed but most of these are relatively inefficient. In order to obtain a high output, also, the vanes must be of excessive length and a complex tower is needed to carry such a large structure.

It has been proposed, as in the U.S. Pat. Nos. to Tapalov, 2,335,817 and 2,379,324 to provide a stream motor having a plurality of parallel shafts with the shafts of a pair rotating in opposite directions and with adjustable pivotally mounted deflecting members to increase the span or cross sectional area of the stream which can be utilized. The structure is pivotally supported and automatically rotated to face the stream. The structures shown depend entirely upon the direct stream of fluid and do not attempt to reduce the pressure of the exhausted stream for increased power input. Dickinson, in U.S. Pat. No. 1,312,021 shows motive power means for utilizing the energy of air currents which includes a circular cowl or funnel disposed in front of an air turbine to act as an air scoop to collect air and direct it to the turbine with increased velocity. An enclosing casing of stream line formation is provided for accelerating the rearward movement of the exhaust air from the turbine. The apparatus can be mounted on a fixed support with a vane, to keep its head to the wind.

The circular construction employed imposes serious limits on the size and the structure, by reason of its construction, would be very expensive to build.

Crompton, in U.S. Pat. No. 3,339,078, shows a wind turbine in which a wind motor is provided in a venturi wind gathering body formed as a body of revolution and with the longitudinal or shaft axis concentric with the longitudinal axis of the body. The body is described as having an aeroplane leading edge as for a wing with an interior venturi throat, and the exterior surface is also a surface of revolution. In order to face the device into the wind a tail vane is provided.

The structure of Crompton is difficult and expensive to construct, is necessarily limited in the ability to increase its capacity in any manner other than by increase of diameters, and has other shortcomings.

It has also been proposed as in the U.S. Pat. to Morris, No. 2,555,807, to mount wing tip lights on the rotating wing of a helicopter or other rotative wing aircraft. A passageway (FIGS. 1 and 2) is provided between the leading edge and the trailing edge of the rotor to provide an air stream to flow at high velocity through the passageway to drive a turbine wheel in the passageway which in turn drives a generator in the rotating wing to activate the wing tip lights. In FIG. 4 the passageway is eliminated and the air turbine wheel is set so that the vanes project below the adjacent lower surface to the air flow beneath the wing.

The mounting of an air turbine wheel in the rotating wing of a rotary wing aircraft, while it may provide sufficient power to energize small lights, is not adapted for multiple horse power units and does not function in a comparable manner to the structure of the present invetion.

The foregoing structures lack the simple and effective structure hereinafter described.

Summary of the Invention

In accordance with the invention a wind operated power plant is provided in which a pair of longitudinally elongated air guide members are provided, one right handed and one left handed, having a cross section to provide inwardly disposed facing surfaces to provide a converging tunnel and outwardly disposed surfaces to produce a suction action, each of the members having a passageway connecting the inner and outer surfaces, each of the passageways having an air operated impeller therein with vanes extending into the tunnel, the length of the air guide members determining the capacity of the power plant. The air guide members are preferably mounted with their longitudinal axes vertical, and in engagement at one end with frame plate mounted for rotation to face the tunnel into the wind, a vane preferably being provided for this purpose. The shafts of impellers are preferably connected to electric generators for power generation.

It is the principal object of the invention to provide a wind operated power plant which is simple and inexpensive in construction, light in weight and effective in its action.

It is a further object of the invention to provide a wind operated power plant which can be constructed for various outputs by merely elongating the air guide members and the impellers and braces therein.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which FIG. 1 is a side elevation of a power plant in accordance with the invention;

FIG. 2 is a front elevation of the power plant shown in FIG. 1;

FIG. 4 is a horizontal sectional view taken approximately on the line 4—4 of FIG. 3;

Figure 3:
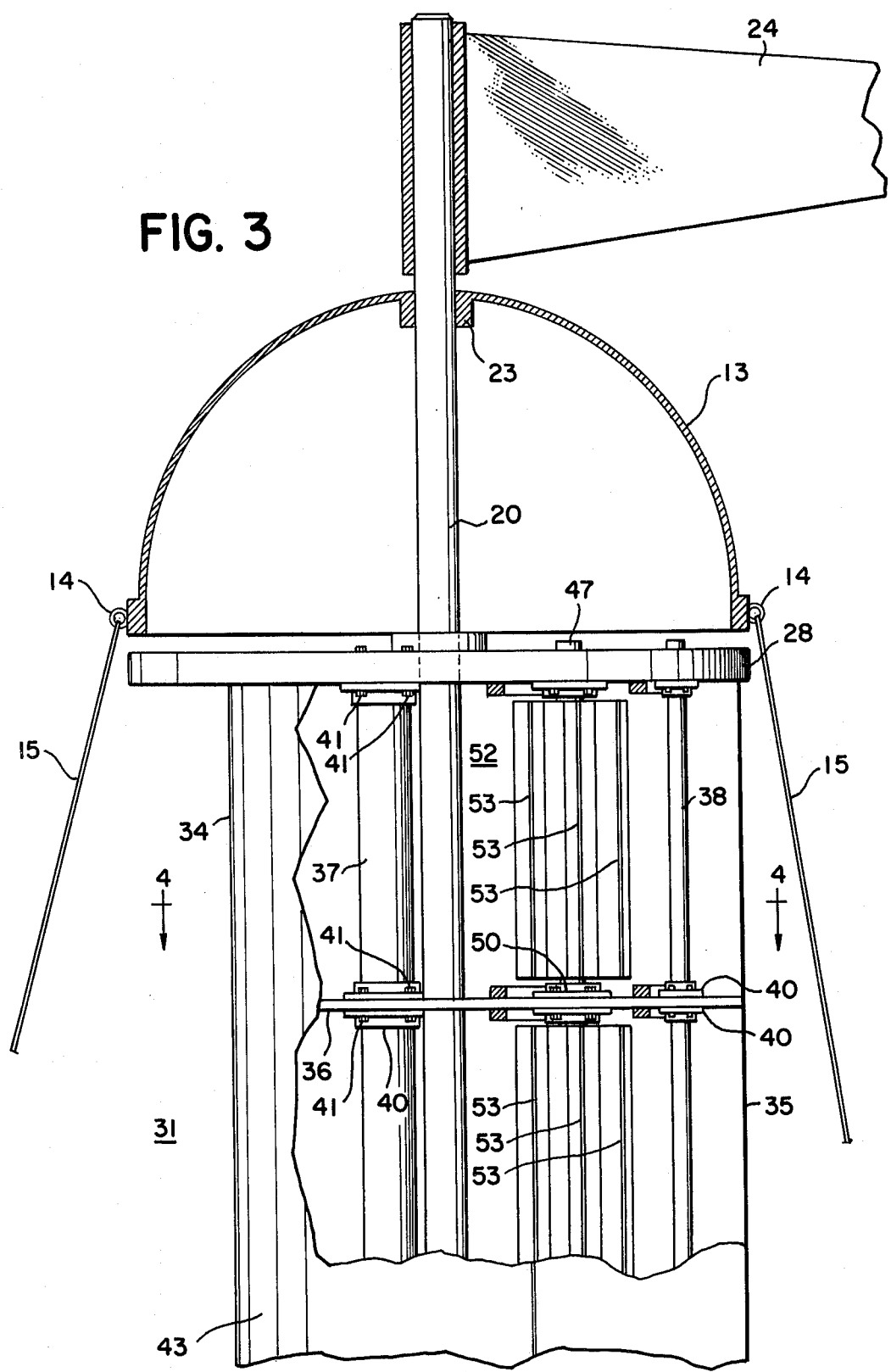
FIG. 3 is a fragmentary view in elevation, and on a larger scale, of the upper part of the power plant of FIG. 1 parts being broken away to show the interior construction.
Figure 5:
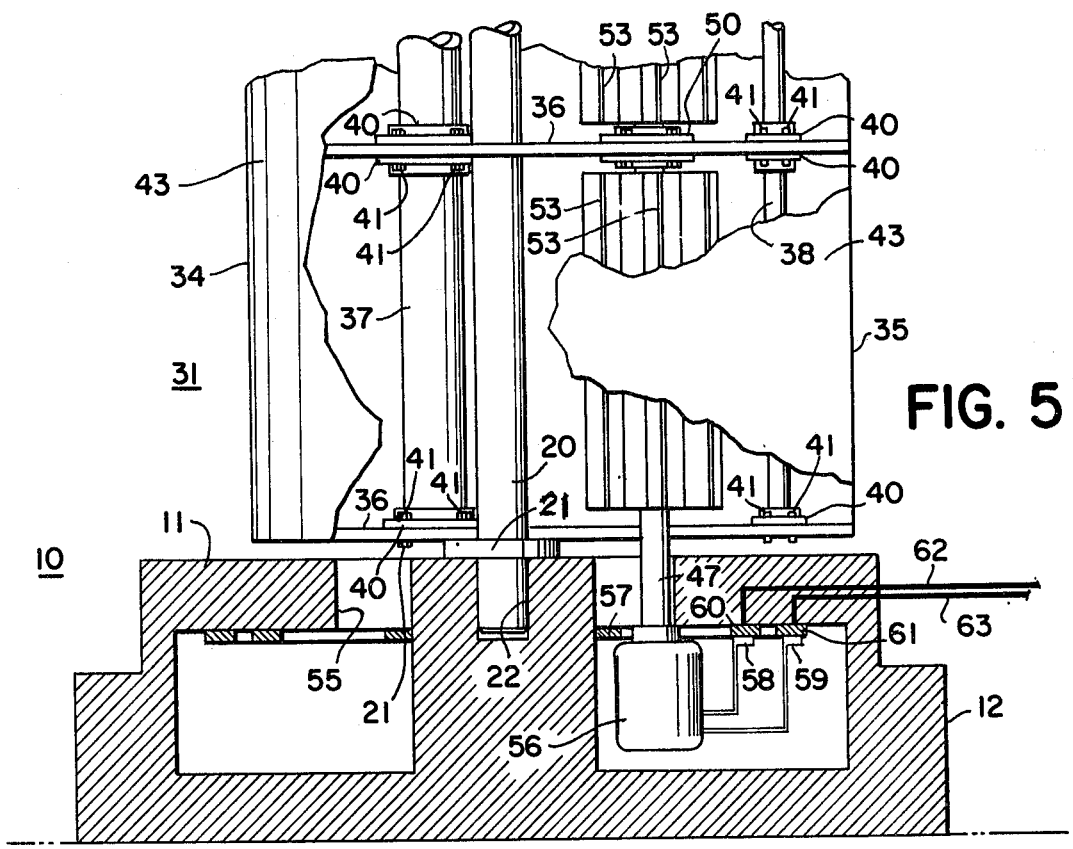
FIG. 5 is a fragmentary view in elevation, and on a larger scale, of the lower portion of FIG. 1, parts being broken away to show the interior construction.
Figure 6:
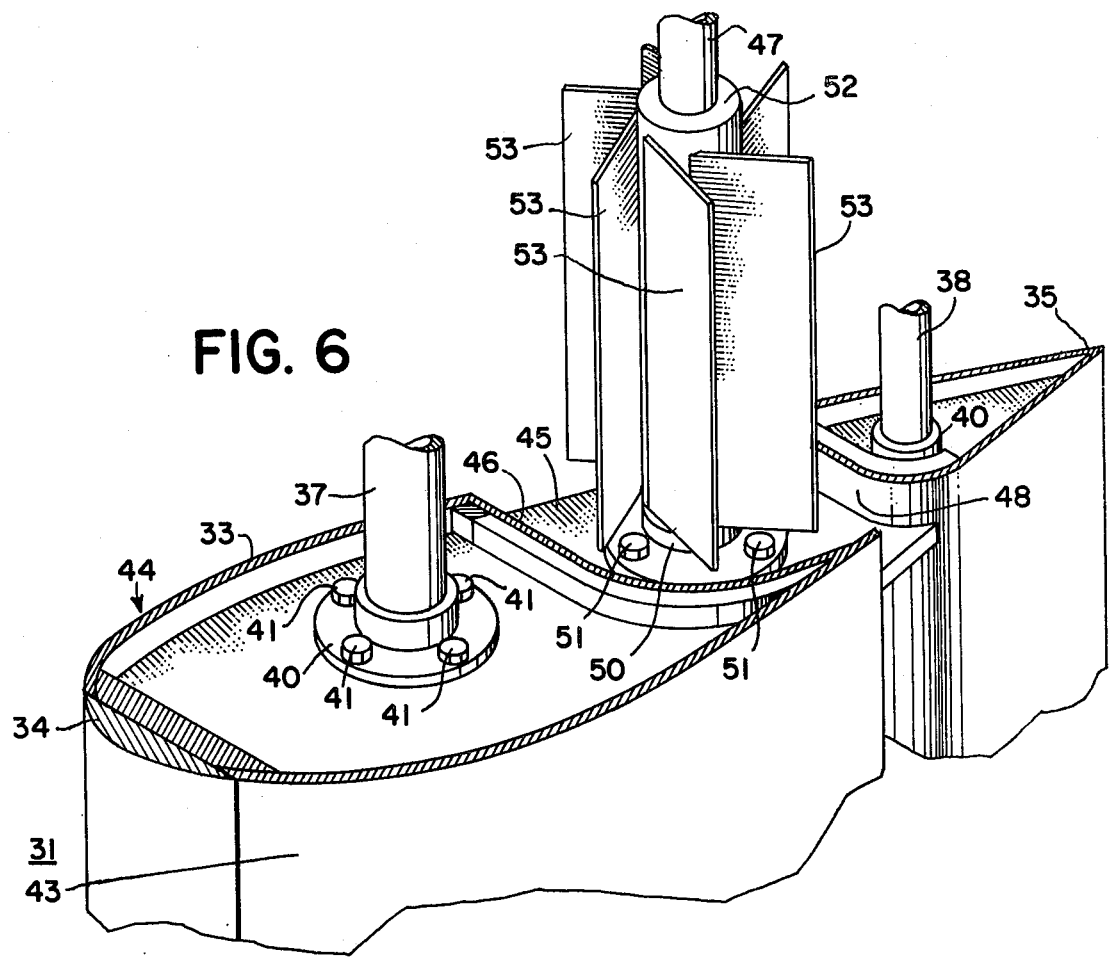
FIG. 6 is a fragmentary perspective view showing the interior construction of one of the air guiding members and its impeller.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings in which a preferred embodiment of the invention is shown in which the power plant is illustrated as an upright unit. A base 10 is provided which can be mounted on the ground or on the roof of a building, as desired. The base 10 has a rigid platform 11 and a downwardly extending skirt 12. A cap 13, at the top of the unit and shown as of hemispherical shape, has eyes 14 at spaced locations around its lower periphery from which guy wires 15 extend to and are secured to the ground or to the roof for bracing the unit.

A vertical shaft 20, which may be provided with an airfoil shape or may be tubular, is provided, having a supporting collar 21 thereon, is journaled in a suitable socket 22 in the base 10. The shaft 20 is journaled in a bearing 23 carried by the cap 13 and exteriorly of the cap 13 has an orienting vane 24 secured thereto for positioning the shaft 20.

The shaft 20 has fixed thereto for movement therewith a frame plate 28 to which vertically disposed air guiding elements 30 and 31 of opposite hand are secured.

Each of the air guiding elements 30 and 31 has a continuous outer skin or cover 33 with a nose tip 34 and trailing end 35 with internal horizontal bracing walls or panels 36. Within the interior of the air guiding elements 30 and 31 vertically disposed hollow tubular front braces 37 and rear braces 38 are provided, flanges 40 on each face of the panels 36 and through which the braces 37 and 35 extend being secured to the panels 36 by bolts 41.

The exterior faces of the air guiding elements 30 and 31 are shaped to correspond to those of airplane wings so that the outer face portions 43 produce a vacuum action therealong and to trailing ends 35 while the inner face portions 44 produce a positive pressure thereon. The disposition of the guiding elements 30 and 31 as illustrated also provides between these elements a funnel action to increase the pressure and velocity between the converging face portions 44 from the front toward the rear of the elements 30 and 31, and to a throat 39 with a substantially parallel discharge passageway 39a at the rear ends of the guiding elements 30 and 31.

The face portions 44 and 43 have extending therebetween passageways 45 extending outwardly and rearwardly from the throat 39, bounded at the front by an arcuate wall 46 concentric with the axis of an impeller shaft 47 therein, and at the rear by a transverse and then rearwardly curved wall 48. The impeller shaft 47, of the desired length in accordance with the vertical height of the guiding elements 30 and 31 is preferably journaled in bearings 50 carried by each of the panels 36 and held in place by bolts 51.

The impeller shaft 47, between panels 36 and within the passageway 45 has impellers 52 secured thereto. The impellers 52 have vertical vanes 53 which project into the throat 39.

The number of impellers 52 which are employed is determined by the desired height of the unit so that various capacities are available without substantial change except for height and without the necessity for substantial modification of the structure except for the height of the shafts 20 and 47, the height of the braces 37 and 38 and the height of the air guiding elements 30 and 31.

The shafts 47 extend downwardly through a circular slot 55 and have the rotors of electric generators 56 driven thereby.

The generators 56 are carried by rotatable frame plates 57 supported by the base 10 and have brushes 58 and 59 contacting insulated commutator rings 60 and 61 from which conductors 62 and 63 extend for delivery of electric energy.

The mode of operation will now be pointed out.

With the unit positioned by the wind acting on the positioning vane 24 wind enters the tunnel between the wind guiding elements 30 and 31 where it is compressed with increase of pressure to the throat 39. The passageway 45 is available for discharge of a substantial portion of the air in the throat 39 thus being aided by the vacuum effective at the outlet of the passageway by reason of the shape of the wall section 43 and the air moving therealong. Air in passing through the throat 39 and the passageways 45 acts on the vanes 53 to rotate the impellers 52 on each side of the throat 39.

The discharge passageway is effective to prevent pressure overload on the vanes 53 in the event of extremely high winds.

It will be noted that the guiding elements 30 and 31 and the disposition of their respective surfaces provides a balanced action of the wind with respect to the guiding elements 30 and 31 and the impellers 52.

We claim:

1. A wind operated power plant comprising
   a pair of spaced elongated air guiding elements having elongated outer faces and elongated inner faces,
   the inner faces of each of said elements being in facing relation to provide an air tunnel,
   the inner and outer faces of each element having a air discharge passageway therebetween,
   an elongated impeller shaft in each of said passageways and parallel to said inner and outer faces, and
   impeller members on each of said shafts and driven by air entering said tunnel and said discharge passageways.

2. A wind operated power plant as defined in claim 1 in which
   the elongated outer faces are disposed to generate a pressure reduction therealong and at the discharge end of said discharge passageways.

3. A wind operated power plant as defined in claim 1 in which
   said inner faces are in converging relation to a rearwardly disposed throat with which the inlets of said discharge passageways are in communication.

4. A wind operated power plant as defined in claim 3 in which
   a discharge passageway is provided extending rearwardly from said throat.

5. A wind operated power plant as defined in claim 1 in which
   said air guiding elements are vertically disposed, and
   rotatable support means is provided for said air guiding elements.

6. A wind operated power plant as defined in claim 5 in which
   a vane is provided for positioning said air guiding elements for air delivery therebetween.

7. A wind operated power plant as defined in claim 1 in which
   said air guiding elements intermediate their ends are provided with bracing panel members transverse to the outer faces,
   said impeller shaft extends through said bracing panel members, and
   impeller members are provided on said shaft between contiguous pairs of said panel members.

8. A wind operated power plant as defined in claim 5 in which a base is provided having a vertical shaft carried thereby, and said rotatable support means is carried thereby.

9. A wind operated power plant as defined in claim 8 in which a cap is provided at the upper end of said vertical shaft, and guy members are provided connected to said cap.

10. A wind operated power plant as defined in claim 1 in which each of said elongated air guiding elements has the shape of an airplane wing.

* * * * *

UNITED STATES PATENT OFFICE
CERTIFICATE OF CORRECTION

Patent No. 4,088,419　　　　　　　　　Dated May 9, 1978

Inventor(s) Henry F. Hope and Stephen F. Hope

It is certified that error appears in the above-identified patent and that said Letters Patent are hereby corrected as shown below:

ABSTRACT,

Line 14, "airfold" should be - airfoil - .

Signed and Sealed this

Nineteenth Day of September 1978

[SEAL]

Attest:

RUTH C. MASON　　　　　　　　　　DONALD W. BANNER
*Attesting Officer*　　　　　　*Commissioner of Patents and Trademarks*